(12) United States Patent
Driscoll

(10) Patent No.: US 11,552,781 B2
(45) Date of Patent: Jan. 10, 2023

(54) USING ERROR DETECTION BITS FOR CRYPTOGRAPHIC INTEGRITY AND AUTHENTICATION

(71) Applicant: Honeywell International Inc., Morris Plains, NJ (US)

(72) Inventor: Kevin Raymond Driscoll, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 542 days.

(21) Appl. No.: 16/376,833

(22) Filed: Apr. 5, 2019

(65) Prior Publication Data
US 2020/0322126 A1 Oct. 8, 2020

(51) Int. Cl.
*H04L 9/06* (2006.01)
*H04L 1/00* (2006.01)
*H04L 9/32* (2006.01)
*H04L 9/08* (2006.01)

(52) U.S. Cl.
CPC .......... *H04L 9/0618* (2013.01); *H04L 1/0061* (2013.01); *H04L 9/0643* (2013.01); *H04L 9/0861* (2013.01); *H04L 9/3242* (2013.01); *H04L 9/0637* (2013.01); *H04L 2209/34* (2013.01)

(58) Field of Classification Search
CPC ... H04L 9/0618; H04L 9/0643; H04L 1/0061; H04L 9/3242; H04L 9/0861; H04L 1/0041; H04L 1/0045; H04L 2209/34; H04L 9/0637
See application file for complete search history.

(56) References Cited

U.S. PATENT DOCUMENTS

| | | | |
|---|---|---|---|
| 4,654,480 | A | 3/1987 | Weiss |
| 5,204,903 | A | 4/1993 | Okada et al. |
| 5,592,553 | A | 1/1997 | Guski et al. |
| 6,760,440 | B1 | 7/2004 | Driscoll |
| 6,763,363 | B1 | 7/2004 | Driscoll |
| 6,804,354 | B1 | 10/2004 | Driscoll |
| 6,912,284 | B1 | 6/2005 | Palmatier |
| 7,069,438 | B2 | 6/2006 | Balabine et al. |
| 7,277,543 | B1 | 10/2007 | Driscoll |

(Continued)

OTHER PUBLICATIONS

Szilagyi et al., "A Flexible Approach to Embedded Network Multicast Authentication," Carnegie Mellon University, Jan. 2008, 7 pp.

(Continued)

*Primary Examiner* — Cheng-Feng Huang
(74) *Attorney, Agent, or Firm* — Shumaker & Sieffert, P.A.

(57) ABSTRACT

In some examples, a method includes receiving a plaintext message including plaintext data and error detection bits. The method also includes encrypting the plaintext message based on a feedback algorithm to generate an encrypted message including a set of encrypted bits for error detection, cryptographic integrity, and cryptographic authentication. The set of encrypted bits for error detection, cryptographic integrity, and cryptographic authentication can replace the error detection bits in whole or in part. A receiver can confirm the cryptographic integrity and the cryptographic authentication of the encrypted message by decrypting the set of encrypted bits.

20 Claims, 9 Drawing Sheets

(56) References Cited

U.S. PATENT DOCUMENTS

| | | |
|---|---|---|
| 7,363,494 B2 | 4/2008 | Brainard et al. |
| 8,185,809 B2 | 5/2012 | Luby et al. |
| 8,234,540 B2 | 7/2012 | Buchmann et al. |
| 8,549,296 B2 | 10/2013 | Driscoll |
| 8,607,045 B2 | 12/2013 | Bailey et al. |
| 8,693,683 B2 | 4/2014 | Emelko |
| 8,838,973 B1 | 9/2014 | Yung et al. |
| 8,842,841 B2 | 9/2014 | Hook et al. |
| 8,904,183 B2 | 12/2014 | Bellur et al. |
| 9,086,992 B1 | 7/2015 | Briggs |
| 9,450,925 B2 | 9/2016 | Driscoll |
| 9,491,165 B2 | 11/2016 | Koneru |
| 2002/0018565 A1 | 2/2002 | Luttrell et al. |
| 2003/0065934 A1* | 4/2003 | Angelo ............ H04W 8/245 726/35 |
| 2008/0077795 A1 | 3/2008 | Macmillan |
| 2008/0240434 A1* | 10/2008 | Kitamura ............ G06F 21/80 380/255 |
| 2009/0252323 A1* | 10/2009 | Cooper ............ H04L 9/3247 380/54 |
| 2009/0254754 A1 | 10/2009 | Bellur et al. |
| 2011/0286596 A1* | 11/2011 | Gressel ............ H04L 63/12 380/268 |
| 2016/0226828 A1 | 8/2016 | Bone |
| 2017/0126409 A1* | 5/2017 | Freudiger ........... H04W 12/041 |
| 2017/0134369 A1 | 5/2017 | Bilal et al. |
| 2018/0060612 A1* | 3/2018 | Gladwin ............ G06F 21/85 |
| 2018/0069841 A1 | 3/2018 | Benedek |
| 2019/0095101 A1* | 3/2019 | Leggette ............ H04L 1/06 |
| 2019/0105554 A1* | 4/2019 | Rouillard ............ G06K 19/07 |
| 2019/0109711 A1* | 4/2019 | Gladwin ............ H04L 9/0869 |
| 2020/0106613 A1* | 4/2020 | Newman ............ H04L 9/3231 |
| 2020/0127821 A1* | 4/2020 | Dolev ............ H04L 63/0823 |
| 2020/0313909 A1* | 10/2020 | Mondello ............ H04L 9/3268 |

OTHER PUBLICATIONS

"S/KEY," Wikipedia the only Encyclopedia, accessed from http://en.wikipedia.org/wiki/S/KEY, accessed on Jan. 23, 2019, 4 pp.

Perrig et al., "Timed Efficient Stream Loss-Tolerant Authentication (TESLA) Multicast Source Authentication Transform Introduction," RFC 4082, Network Working Group, IEEE, Jun. 2005, 20 pp.

Driscoll, "BeepBeep: Embedded Real-Time Encryption," International Workshop on Fast Software Encryption, Jul. 12, 2002, 15 pp.

Perrig et al., "The TESLA Broadcast Authentication Protocol," CryptoBytes, Aug. 5, 2002, 12 pp.

* cited by examiner

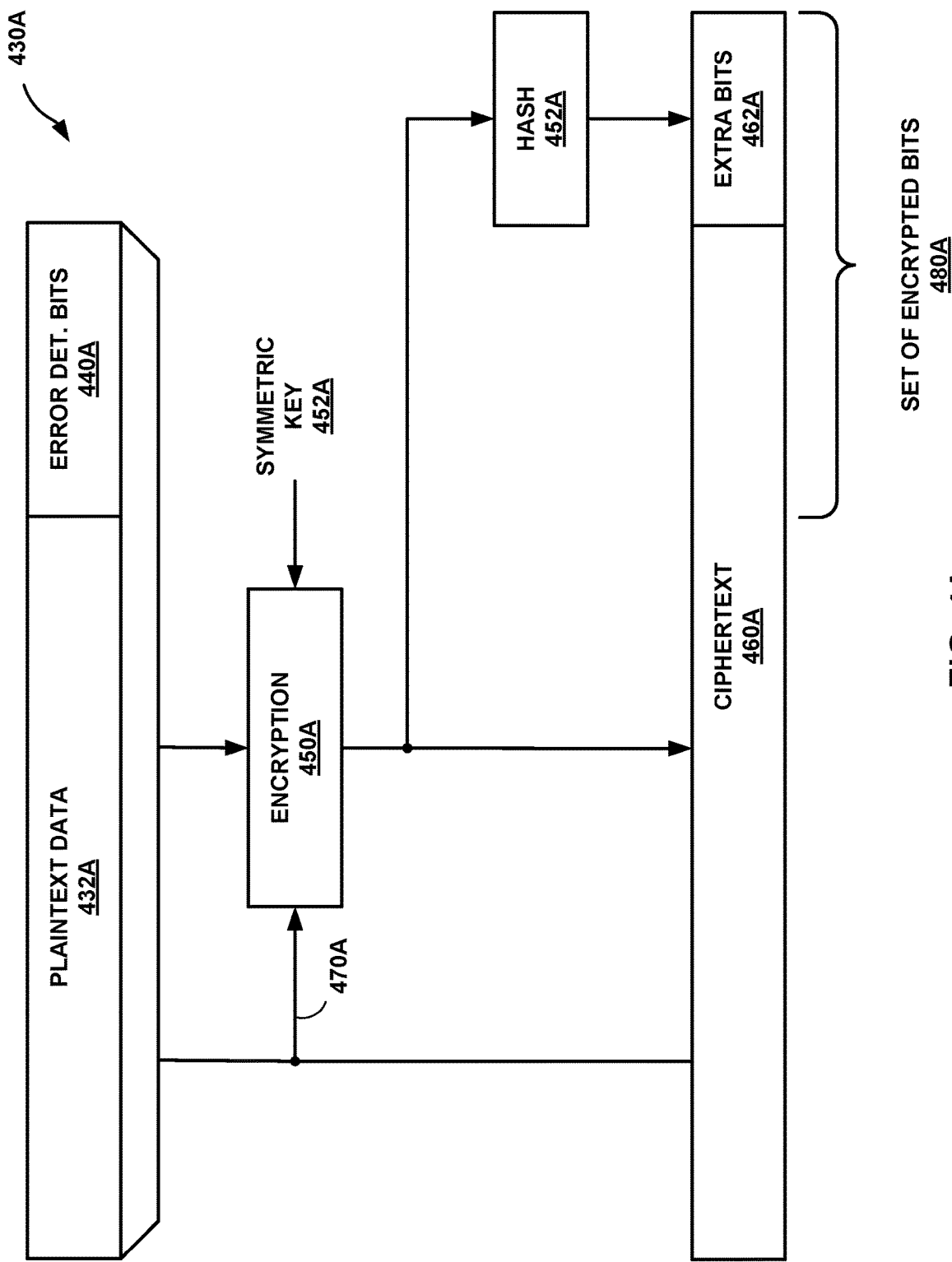

US 11,552,781 B2

USING ERROR DETECTION BITS FOR CRYPTOGRAPHIC INTEGRITY AND AUTHENTICATION

TECHNICAL FIELD

This disclosure relates to cryptographic systems.

BACKGROUND

Error detection bits are used to verify the non-cryptographic integrity of a message. A simple example of an error detection bit is a parity bit at the end of a bit stream. The value of the parity bit (e.g., zero or one) at the end of each bit stream is set so that the number of ones in the bit stream is either even or odd. For example, for an even parity bit, a sender may count the number of ones in a bit stream (e.g., a byte of data) and set the parity bit to zero if the bit stream includes an even number of ones. If the bit stream includes an odd number of ones, the sender will set the parity bit to one.

A cyclic redundancy check (CRC) is a more complex example of error detection bits. The values of the CRC bits are based on the remainder of polynomial division of the data block. For example, a Controller Area Network (CAN) bus uses a fifteen-bit CRC, and IEEE 802.3 (i.e., Ethernet) uses a thirty-two-bit CRC. A sender generates and appends the CRC bits to the end of the data block.

A sender can also generate a message authentication code (MAC) for a block of data to confirm the authenticity of the block of data. For example, the sender can apply a keyed hash function to the block of data to generate the MAC. A receiver knowing the secret key used to create the hash can confirm that the message was received from a trusted sender.

SUMMARY

In general, this disclosure relates to systems, devices, and techniques for using the error detection bits of a message for cryptographic integrity and authentication. A plaintext message may include plaintext data and error detection bits such as parity bit(s) or cyclic redundancy check (CRC) bits. By encryption the plaintext message using a feedback algorithm, the encryption of the error detection bits can generate a set of encrypted bits that are used for error detection, cryptographic integrity, and cryptographic authentication. A receiver can decrypt this set of encrypted bits and confirm the cryptographic integrity and cryptographic authenticity based on the decrypted set.

The details of one or more examples of the disclosure are set forth in the accompanying drawings and the description below. Other features, objects, and advantages will be apparent from the description, drawings, and claims.

BRIEF DESCRIPTION OF THE DRAWINGS

FIGS. 4A-4C are conceptual block diagrams of encryption with a hash function to generate extra bits for cryptographic authentication and cryptographic integrity, in accordance with some examples of this disclosure.

DETAILED DESCRIPTION

Figure 1:
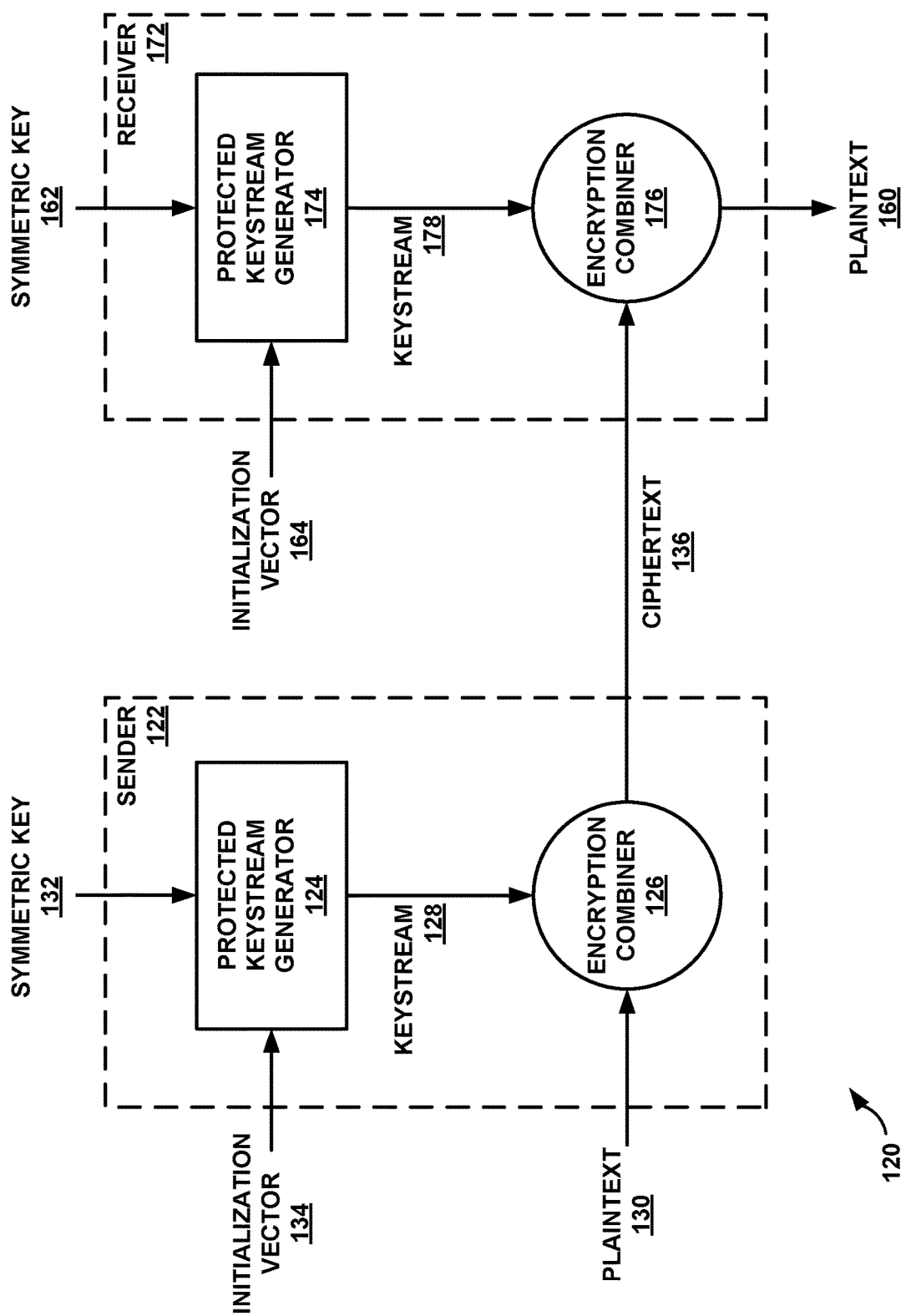
FIG. 1 is a conceptual block diagram of a symmetric-key stream-cipher cryptosystem, in accordance with some examples of this disclosure.

FIG. 1 is a conceptual block diagram of a symmetric-key stream-cipher cryptosystem 120, in accordance with some examples of this disclosure. Stream-cipher cryptosystem 120 includes sender 122, such as a computer system, and receiver 172, such as a computer system. Sender 122 and receiver 172 may be coupled together through a local area network, a wide area network, or the Internet. Sender 122 and receiver 172 may be parts of cyber-physical systems. For example, sender 122 and/or receiver 172 may include devices that run supervisory control and data acquisition (SCADA) systems, such as embedded systems in infrastructure, power generation and distribution systems, and manufacturing plants.

Sender 122 includes protected keystream generator 124 and encryption combiner 126. In some examples, protected keystream generator 124 includes a pseudo-random number generator (PRNG). Protected keystream generator 124 receives secret symmetric key 132, which controls protected keystream generator 124 to produce an encryption protected keystream 128 to be provided to encryption combiner 126. In the example shown in FIG. 1, protected keystream generator 125 also receives initialization vector 134 and uses the initialization vector 134 to ensure that encryption protected keystream 128 is not the same, even in examples in which the same copy of symmetric key 132 is used to control protected keystream generator 124 for multiple messages. Initialization vector 134 may be a true random number or a sequence number to ensure that every message that is encrypted is different.

Figure 5:
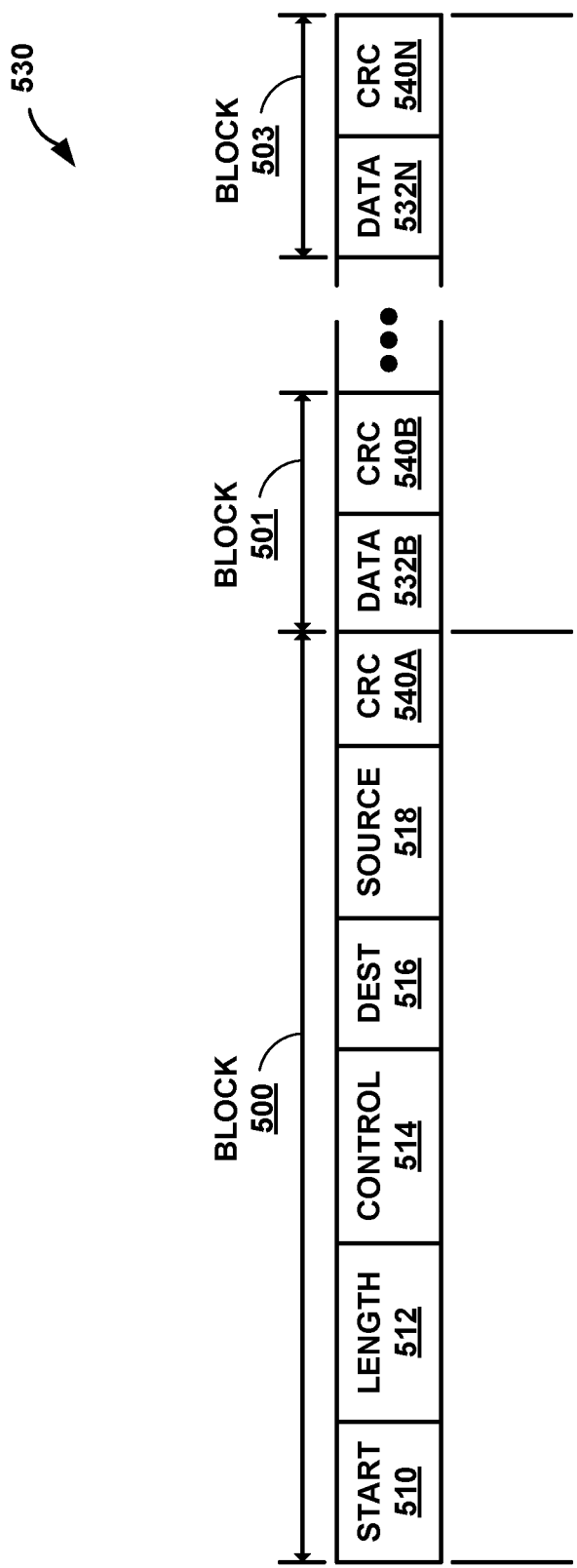
FIG. 5 is a conceptual block diagram of a plaintext message.

Encryption combiner 126 receives plaintext 130, which can be a binary data sequence. Plaintext 130 is a message that includes plaintext data (e.g., data bits) and error detection bits. The error detection bits are generated based on the plaintext data (e.g., by using a hash function or a polynomial function). For example, plaintext 130 can be an Ethernet message with a header, payload, and error detection bits. In the example of an Ethernet packet, the payload may contain thousands of bits, and the error detection bits are a 32-bit cyclic redundancy check (CRC) generated based on the payload (e.g., the plaintext data). In another example, plaintext 130 is a Controller Area Network (CAN) bus message including a data field including up to sixty-four bits and a fifteen-bit CRC. As a further example, plaintext 130 can be a Distributed Network Protocol (DNP3) message with a two-byte CRC at the end of each message. The DNP3 message can also have a two-byte CRC at the end of the message's header and after each additional sixteen bytes of data. An example of the order for a DNP3 message is shown in FIG. 5.

Encryption combiner 126 combines plaintext 130 and encryption protected keystream 128 to form ciphertext 136, which may also be a binary data sequence. In some examples, encryption combiner 126 is implemented with exclusive-or (XOR) bit-wise logic gates to perform bit-wise module-2 addition. Sender 122 includes a communication module (e.g., a transceiver or transmitter) for sending ciphertext 136 to receiver 172. Receiver 172 also includes a communication module (e.g., a transceiver or receiver) for receiving ciphertext 136 to receiver 172. The communication modules can include an input/output interface such as an antenna, a pin, or a port on sender 122 or receiver 172.

In some examples, sender 122 and/or receiver 172 may include bump-in-the-wire devices inserted into an existing communications system. For example, sender 122 may receive plaintext 130 from a transmitting client, and sender 122 can encrypt plaintext 130 to generate ciphertext 136. Additionally or alternatively, receiver 172 can pass decrypted plaintext 160 along to a receiving client.

Receiver 172 includes protected keystream generator 174 and decryption combiner 176. In some examples, protected keystream generator 174 includes a PRNG. Protected keystream generator 174 receives secret symmetric key 162, which is the same symmetric key as symmetric key 132 in some examples. Protected keystream generator 174 is controlled by symmetric key 162 to produce decryption protected keystream 178, which is received by decryption combiner 176. In the example shown in FIG. 1, protected keystream generator 174 receives initialization vector 164, which may be the same initialization vector as initialization vector 134. In examples in which initialization vector 164 is the same as initialization vector 134, initialization 164 ensures that decryption protected keystream 178 is identical to encryption protected keystream 128 for a given symmetric key 132 and 162 and initialization vector 134 and 164.

In examples in which protected keystream generators include PRNGs, the PRNGs can have the following general characteristics to produce cryptographically secure keystreams 128 and 178. First, the period of a keystream must be large enough to accommodate the length of the transmitted message. Second, the keystream output bits must be easy to generate. Third, the keystream output bits must be hard to predict. Each PRNG may include a linear feedback shift register (LFSR) with N storage elements and a linear feedback function that expresses each new element a(t) of the sequence, in terms of the previous generated elements a(t-N), a(t-N+1), a(t-1). The LFSR storage elements, also referred to as stages, store binary signals a(O), a(1), a(2), ..., a(N-1) as initial data to generate a keystream sequence. The LFSR may be included within functions that ensure PRNG unpredictability.

To ensure the security of ciphertext 136, sender 122 can use an encryption scheme that allows receiver 172 to confirm the cryptographic integrity and the cryptographic authenticity of ciphertext 136. One example technique for ensuring cryptographic integrity and authenticity is a message authentication code (MAC). However, a MAC can increase the length of ciphertext 136, as compared to the length of plaintext 130. Thus, another encryption algorithm may result in an increase in length for ciphertext 136, as compared to plaintext 130.

In some applications, an increase in the length of the ciphertext message, as compared to the plaintext message, is not desirable or even possible. One example where increasing the length of the ciphertext message is not allowed is the in-place replacement of data on a computer disk or encryption of messages where transmission timing cannot be altered. An increase in the length of the ciphertext may also be undesirable or prohibitive due to additional power consumption or other secondary costs. An additional problem is the indication to a receiver that authentication has failed, particularly for retrofit applications of cryptography. In particular, "bump in the wire" retrofit decryption devices have no path outside of the message path in which to alert the receiving client of the bump-in-the-wire device that a message has failed integrity or authentication checks. However, the bump-in-the-wire device can signal such failures by passing on the incorrect error detection bits to a receiving client, per aspects of this disclosure.

In accordance with various aspects of this disclosure, encryption combiner 126 is configured to receive and encrypt plaintext 130, which includes error detection bits, using a feedback algorithm. Using the feedback algorithm, encryption combiner 126 can encrypt a data bit of plaintext 130 based on a function of previous plaintext 130 and ciphertext bits. In examples in which the number of bits for cryptographic integrity and authentication is less than or equal to the number of error detection bits, there may be no increase in bits for cryptographic integrity and authentication. By using a feedback algorithm, encryption combiner 126 can generate ciphertext 130 including a set of bits for error detection, cryptographic integrity, and cryptographic authentication.

Encryption combiner 126 can use the existing message error detection bits that are appended to the data bits of plaintext 130 (e.g., for protocols used in cyber-physical systems) as all or part of the cryptographic integrity and authentication bits. Using the error detection bits can eliminate or reduce the expansion of the message during the encryption process. These techniques can also reduce any message latency added for authentication processing and integrity processing. These techniques allow lower cost, better communication performance, and/or possibly providing Authenticated Encryption in applications where Authenticated Encryption otherwise would not be possible.

Cryptographic authenticity refers to determining that a received message was transmitted by a stated sender. By confirming cryptographic authenticity, receiver 172 can verify that ciphertext 136 originate from sender 122. In examples in which ciphertext 136 from an unauthentic sender (e.g., a sender without a valid keystream), the decryption of ciphertext will produce plaintext 160 including a set of decrypted bits for error detection, cryptographic integrity, and cryptographic authentication that are not correct. Cryptographic integrity refers to whether the contents of ciphertext 136 have arrived at receiver 172 unchanged from the contents of ciphertext 136 produced by encryption combiner 126.

Example details of a feedback algorithm for use by encryption combiners 126 and 176 can be found in "BeepBeep: Embedded Real-Time Encryption" by Kevin Driscoll, published in Fast Software Encryption: $9^{th}$ International Workshop, which is incorporated by reference herein in its entirety. The BeepBeep algorithm is partially autokey because the algorithm carries forward information from previous bits processed (encrypted or decrypted).

The techniques of this disclosure may be useful for bump-in-the-wire devices where latency can be an issue. By providing cryptographic authenticity and integrity without necessarily adding extra bits, the techniques of this disclosure can be used by bump-in-the-wire devices with minimal or no increase in latency, as compared to other cryptographic techniques. Thus, by providing bit-for-bit replacement, the techniques of this disclosure may be useful for retrofit applications because no increase in bit length is necessary, unless the bit quantities for cryptographic authenticity or cryptographic integrity exceed the quantity of error detection bits.

Figure 2:
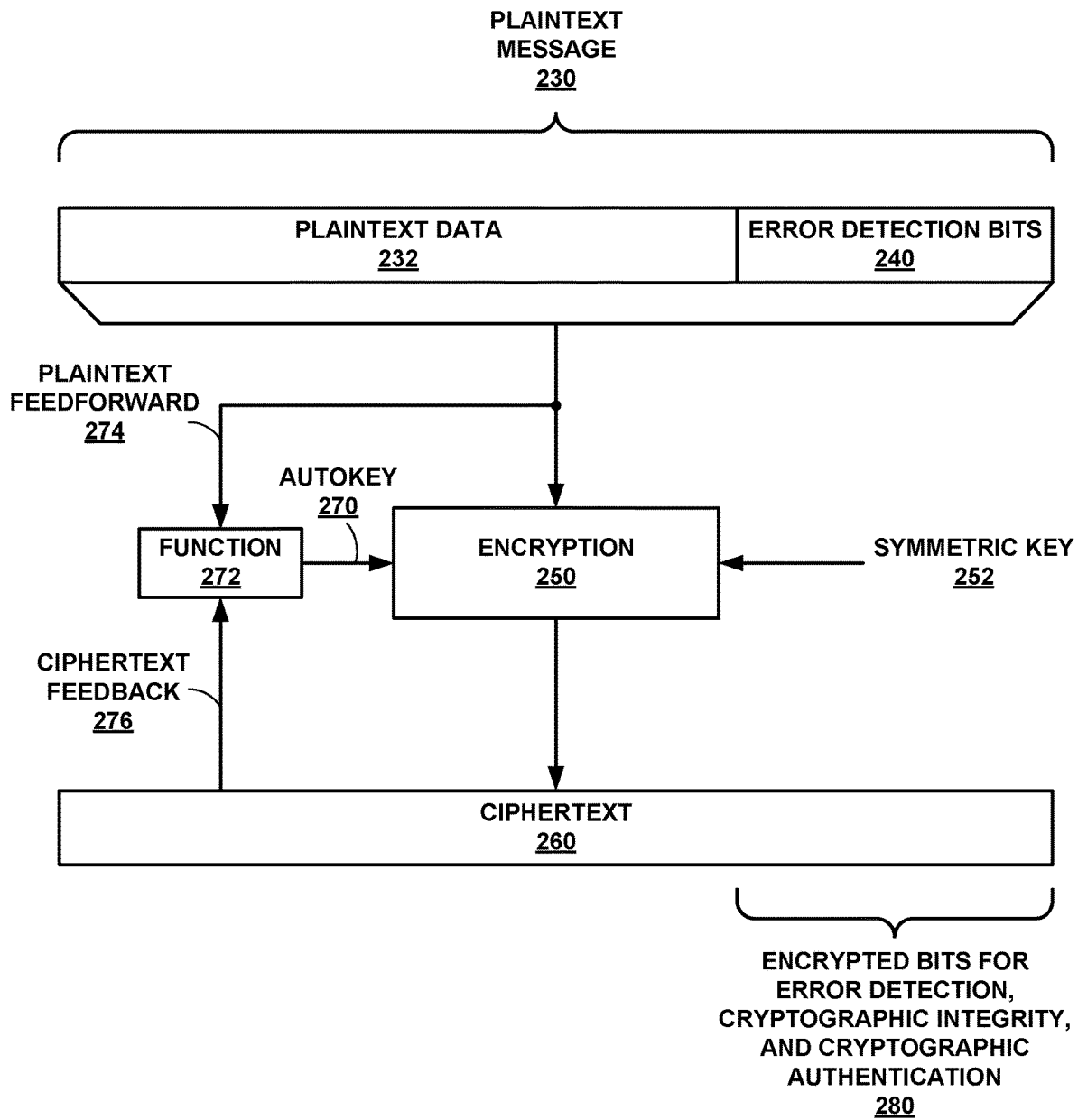
FIG. 2 is a conceptual block diagram of encryption using a feedback algorithm, in accordance with some examples of this disclosure.

FIG. 2 is a conceptual block diagram of encryption using a feedback algorithm, in accordance with some examples of this disclosure. FIG. 2 shows plaintext message 230, which includes plaintext data 232 and error detection bits 240. Encryption block 250 can encrypt the bits of plaintext message 230 based on a feedback algorithm and generated autokey 270 to generate ciphertext 260.

Autokey 270 is based on function 272 of plaintext feedforward 274 and ciphertext feedback 276. For example, function 272 may be a plaintext feedforward algorithm such that autokey 270 is based on plaintext message 230 and not based on ciphertext 260. In another example, function 272 may be a ciphertext feedforward algorithm such that autokey 270 is based on ciphertext 260 and not based on plaintext message 230. Additionally or alternatively, function 272 may be a hybrid algorithm such that autokey 270 is based on plaintext message 230 and ciphertext 260.

In a plaintext feedforward algorithm, autokey 270 is based on bits from plaintext message 230. Encryption block 250 can use an initial symmetric key 252 to encrypt one or more bits of plaintext data 232. Encryption block 250 may then use bits from plaintext message 230 to encrypt subsequent bits within plaintext data 232 and error detection bits 240. In some examples, encryption block 250 encrypts the second bit of plaintext message 230 based on the first bit of plaintext message 230 and initial symmetric key 252, encrypts the third bit of plaintext message 230 based on the second bit of plaintext message 230 and initial symmetric key 252, and so on. An example of a plaintext feedforward encryption algorithm is a plain-fed autokey algorithm. Other examples of such algorithms use more than one previous bit in generating an autokey stream. Decryption of the plaintext feedforward encryption algorithm would be the inverse of the algorithm, using the decrypted plaintext as the source for the autokey. In a ciphertext feedback algorithm, autokey 270 is based on bits previously encrypted bits of ciphertext 260. For example, encryption block 250 can encrypt the second bit of plaintext message 230 based on the first bit of ciphertext 260 (e.g., the encrypted value of the first bit of plaintext message 230) and initial symmetric key 252, and can encrypt the third bit of plaintext message 230 based on the second bit of ciphertext 260 and initial symmetric key 252, and so on.

Set of encrypted bits 280 can function as error detection bits, bits for cryptographic integrity, and bits for cryptographic authenticity. In some examples, set of encrypted bits 280 functions as both a CRC and a MAC without increasing the length of ciphertext 260, as compared to plaintext message 230. In some examples, set of encrypted bits 280 includes N bits, and error detection bits 240 also include N bits, where N is an integer. Thus, encryption block 250 can provide error detection, cryptographic integrity, and cryptographic authenticity without increasing the length of ciphertext 260 beyond the length of plaintext message 230. In examples in which plaintext message 230 has a length of M bits, ciphertext 260 may also have a length of M bits. By preserving the length of plaintext message 230 while providing cryptographic integrity and cryptographic authenticity, encryption block 250 can converse power consumption and reduce latency in the transmission of ciphertext 260 to a receiver.

Figure 3:
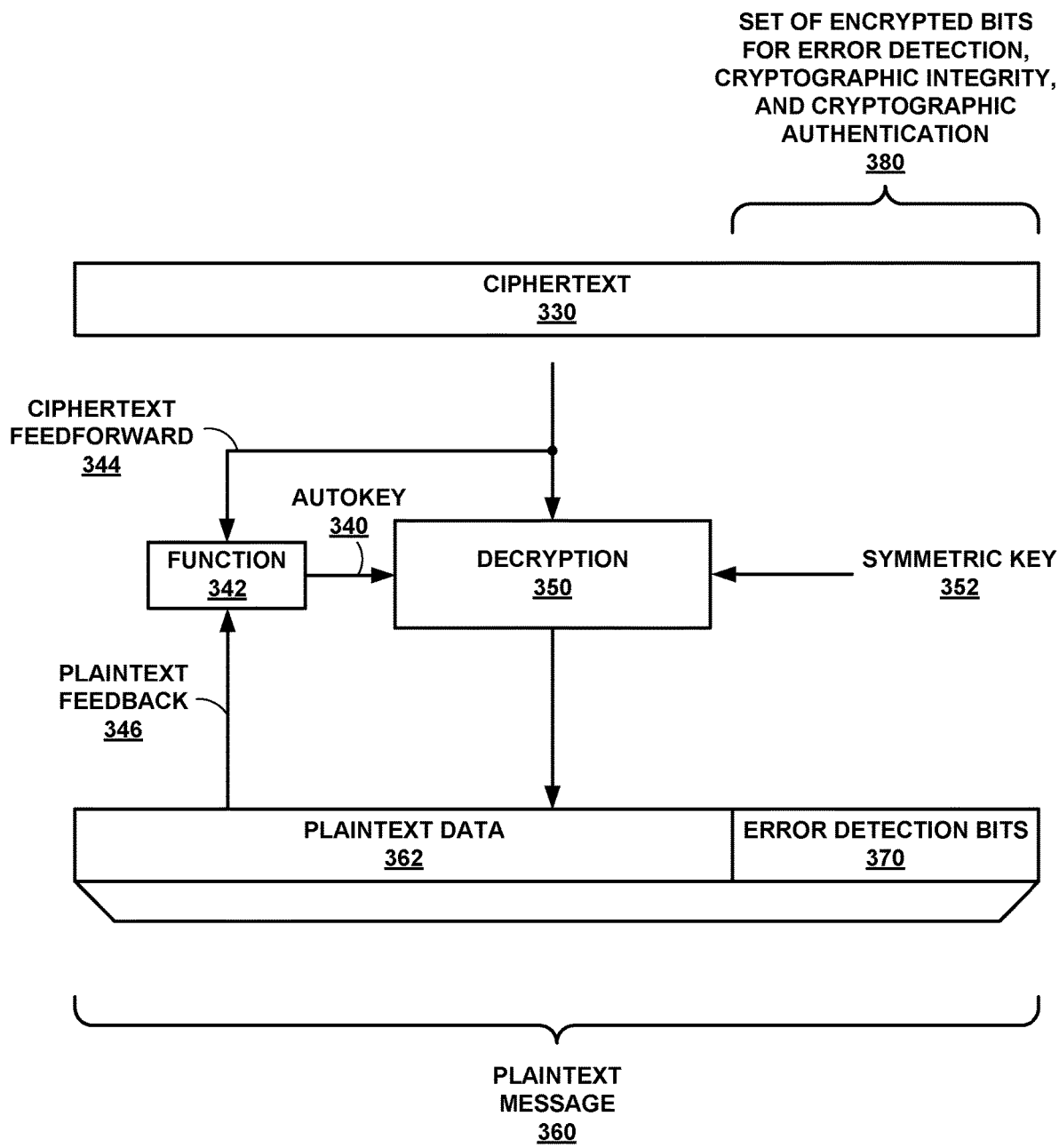
FIG. 3 is a conceptual block diagram of decryption using a feedback algorithm, in accordance with some examples of this disclosure.

FIG. 3 is a conceptual block diagram of decryption using a feedback algorithm, in accordance with some examples of this disclosure. FIG. 3 shows ciphertext 330, which includes set of encrypted bits 380. Decryption block 350 can decrypt the bits of ciphertext 330 based on a feedback algorithm, autokey 340, and symmetric key 352 to generate plaintext message 360 including plaintext data 362 and error detection bits 370.

A receiver can detect errors and confirm the cryptographic integrity and cryptographic authenticity of ciphertext 330 based on set of encrypted bits 380. For example, the receiver can detect errors by decrypting ciphertext 330 into plaintext message 360. The receiver can calculate the error detection bits for plaintext data 362 and determine whether error detection bits 370 match the calculated error detection bits. A mismatch between the calculated and actual error detection bits could indicate an error in ciphertext 330. The mismatch could also indicate that ciphertext 330 lacks cryptographic authenticity or cryptographic integrity because of the feedback algorithm used by decryption 350.

Set of encrypted bits 380 is at the end of ciphertext 330. Thus, for the receiver to correctly decrypt set of encrypted bits 380, ciphertext 330 must be free from errors and tampering. There is error propagation in the feedback algorithm such that any error in ciphertext 330 will be carried forward to whatever else is in ciphertext 330. Because set of encrypted bits 380 are at the end of ciphertext 330, then the carry-forward in the decryption algorithm can be used to verify the cryptographic integrity of ciphertext 330. The decryption algorithm, like the encryption algorithm used by encryption block 250 shown in FIG. 2, carries the state internally.

If an attacker changes a bit in ciphertext 330 before the message arrives at the receiver, the attacker cannot determine the new encrypted error detection bits. The changed bits in the autokey feed into the encryption algorithm such that the attacker cannot predict what the later-encrypted bits will be without knowledge of autokey 340 and symmetric key 352. If an attacker changes a bit of ciphertext 330, the algorithm applied by decryption block 350 will propagate corruption forward. The corruption will prevent the correct decryption of set of encrypted bits 380 and the receiver will detect that the message has an error or has been changed.

Some message protocols have more authentication and integrity bits than error detection bits. For example, an Ethernet message has a 32-bit CRC, but the message may have 64 bits for cryptographic authenticity and cryptographic integrity. Thus, the encryption of a plaintext Ethernet message may include encrypting the 32-bit CRC and adding thirty-two bits more for cryptographic integrity and cryptographic authenticity. In such cases, using the error detection bits for part of the authentication and integrity bits reduces the number of bits that have to be added to the message for authentication and integrity checking.

Figure 4B:
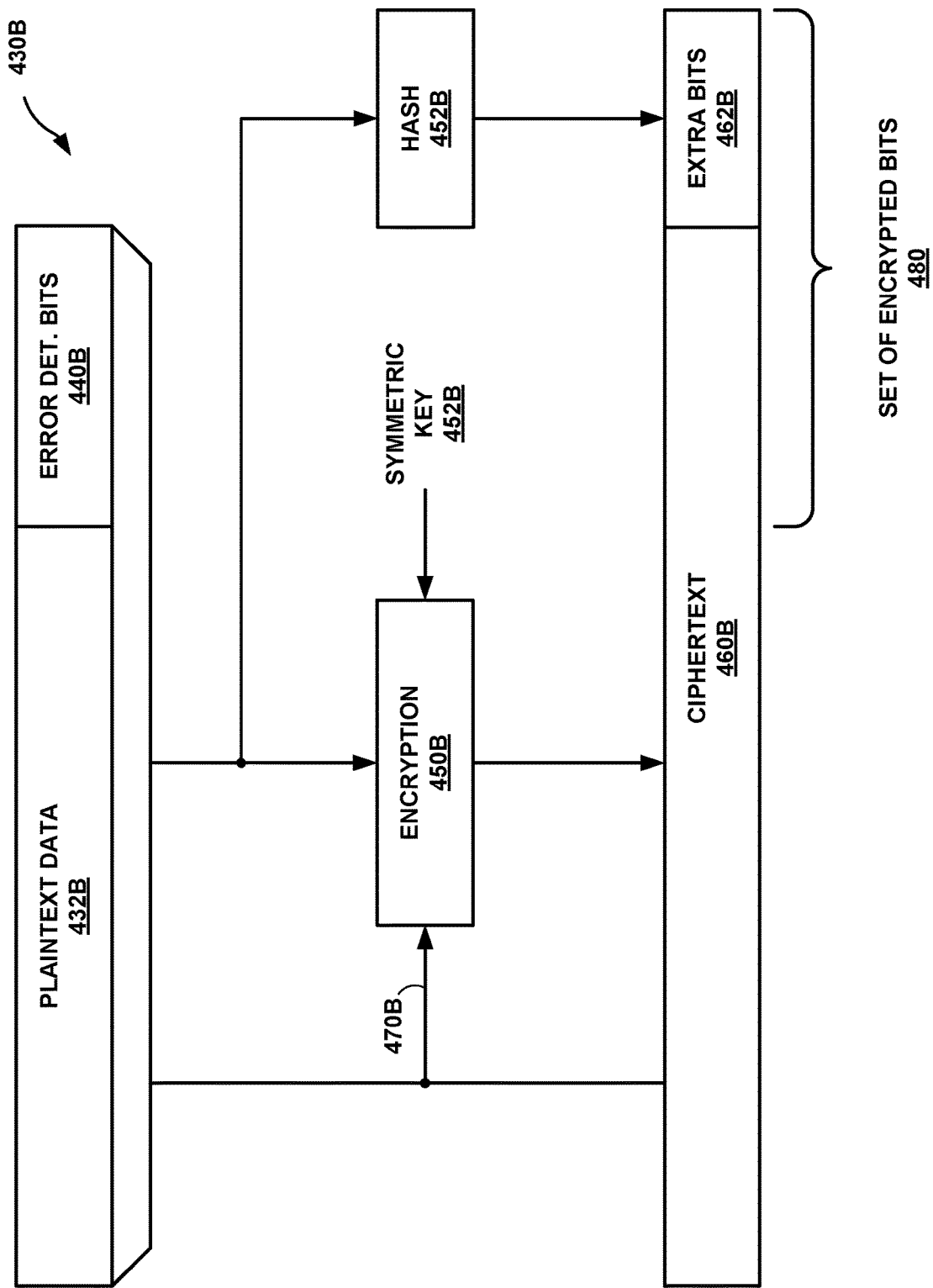
Figure 4C:
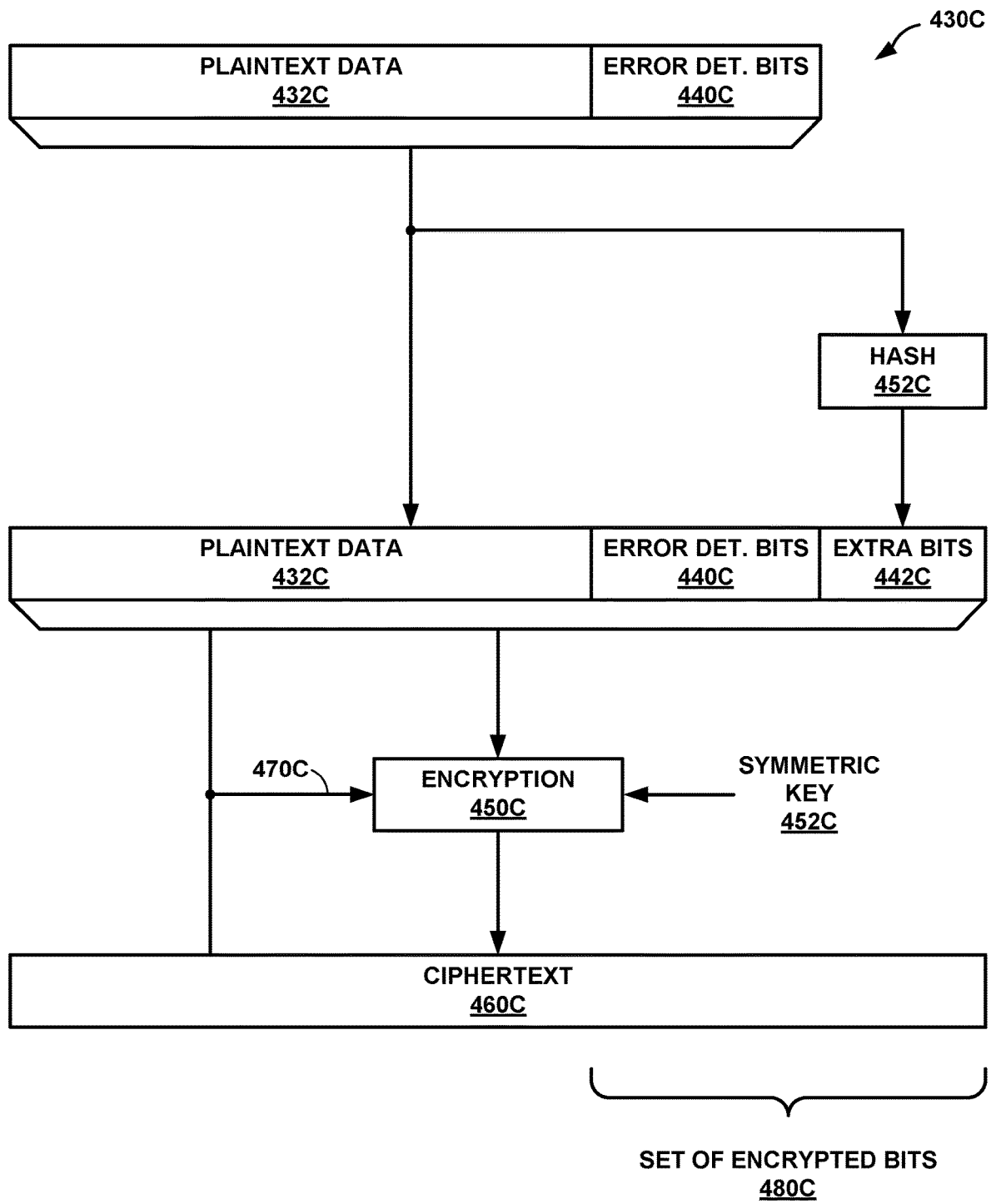

FIGS. 4A-4C are conceptual block diagrams of encryption with a hash function to generate extra bits for cryptographic authentication and cryptographic integrity, in accordance with some examples of this disclosure. For the example shown in each of FIGS. 4A-4C, extra bits are appended to the ciphertext to provide for cryptographic authenticity and cryptographic integrity. In the example shown in FIG. 4C, extra bits 442C are appended to plaintext message 430C before encryption block 450C generates ciphertext 460C by encrypting plaintext message 430C and extra bits 442C.

Encryption block 450A shown in FIG. 4A encrypts plaintext message 430A based on symmetric key 452A and autokey 470A, which may be based on plaintext message 430A and/or ciphertext 460A. In examples in which set of encrypted bits 480A includes additional bits beyond the number of bits in error detection bits 440A, an encryption device can use hash function 452A to generate extra bits 462A for cryptographic integrity and cryptographic authenticity. The encryption of error detection bits 440A provides cryptographic authenticity and cryptographic integrity, but a specific application may use more bits than the number of bits in error detection bits 440A. To generate extra bits 462A for cryptographic authenticity and cryptographic integrity, an encryption device can apply hash function 452A or another transform function to ciphertext 460A.

In the example shown in FIG. 4B, an encryption device applies hash function 452B or another transform function to plaintext message 430B to generate extra bits 462B for cryptographic authenticity and cryptographic integrity. In the example shown in FIG. 4C, an encryption device applies hash function 452C or another transform function to plaintext message 430C to generate extra bits 442C. At encryption block 450C, the encryption device encrypts plaintext message 430C and extra bits 442C to generate ciphertext 460C including set of encrypted bits 480C. Encryption block 450C may be configured to encrypt plaintext message 430C (e.g., plaintext data 432C and error detection bits 440C) and extra bits 442C to generate ciphertext 460C.

A receiver can confirm the cryptographic authenticity and integrity of ciphertext encrypted using one of the techniques shown in FIGS. 4A-4C by decrypting the data portion of the ciphertext and the error detection bits. The receiver can apply the hash function to the ciphertext or plaintext, depending on the encryption technique used, to generate the expected extra bits. The receiver applies the hash function using the secret key that was used to create the hash function, which is the same secret key that the sender used. In response to determining that the expected extra bits match the actual extra bits of the received message, the receiver can confirm the cryptographic authenticity and the cryptographic integrity.

FIG. 5 is a conceptual block diagram of a plaintext message 530. Plaintext message 530 includes blocks 500, 501, and 503 and may include additional blocks of data and CRCs not shown in FIG. 5. Block 500 can be referred to as a header block, and block 501 and 503 can be referred to as data blocks. Plaintext message 530 is an example of a DNP3 message.

Block 500 may have a fixed length of ten bytes, where start field 510 has a length of two bytes, length field 512 has a length of one byte, control field 514 has a length of one byte, destination address field 516 has a length of two bytes, source address field 518 has a length of two bytes, and CRC field 540A has a length of two bytes. The sender generates CRC 540A based on the contents of fields 510, 512, 514, 516, and 518. CRC 540A is an example of error detection bits. A receiver can extract a protocol-identifying bit pattern and/or bit relationships from block 500.

Blocks 501 and 503 include plaintext data 532B and 532N and CRCs 540B and 540N. The sender generates CRCs 540B and 540N based on the contents of plaintext data 532B and 532N. Each of plaintext data field 532B and 532N can have a length of one to sixteen bytes. Each of CRCs 540B and 540N has a length of two bytes. All of the data blocks, including blocks 501 and 503, of plaintext message 530 can have a maximum length of 250 bytes. For other protocols, such as Ethernet and CAN bus, the data fields and error detection bits may have lengths that are different than the example of FIG. 5. The encryption process, decryption process, and authentication and integrity checking per this disclosure can use all of the error detection fields 540A, 540B, ... 540N for authentication and integrity bits using a single autokey encryption or decryption pass over the message 530.

Figure 6:
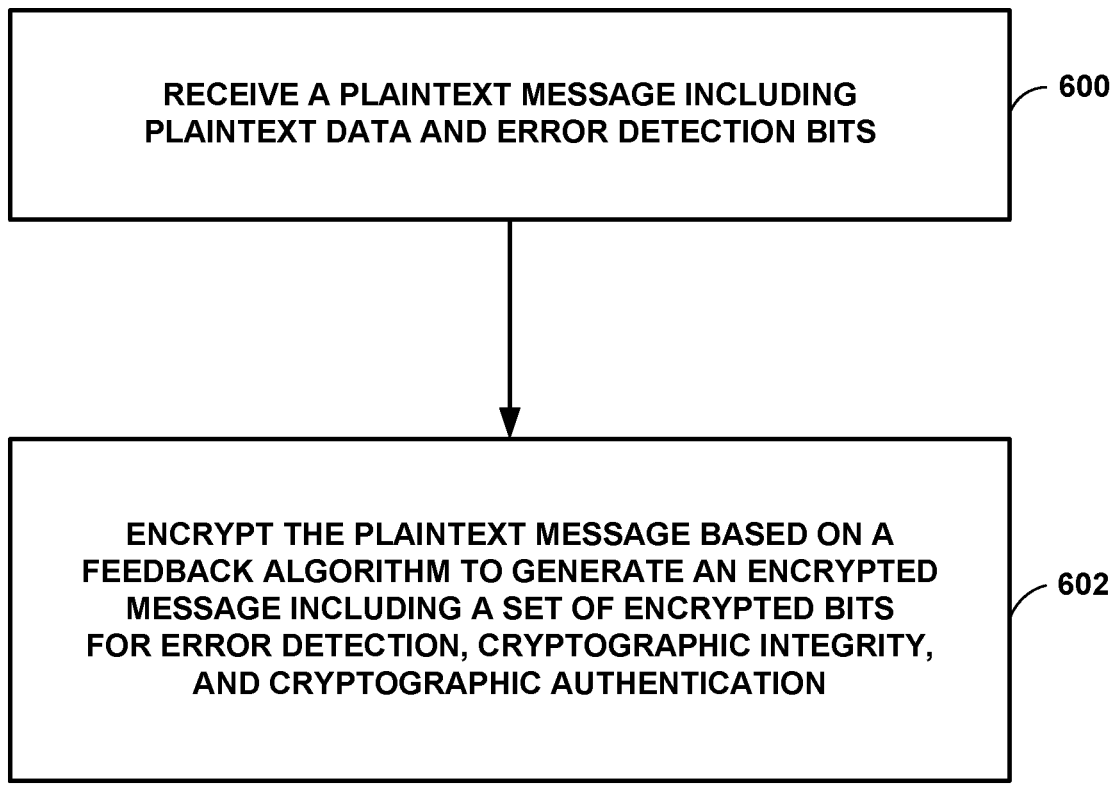
FIG. 6 is a flowchart illustrating an example process for encrypting a message that includes error detection bits, in accordance with some examples of this disclosure.

FIG. 6 is a flowchart illustrating an example process for encrypting a message that includes error detection bits, in accordance with some examples of this disclosure. The example process of FIG. 6 is described with reference to sender 122 shown in FIG. 1, although other components may exemplify similar techniques.

In the example of FIG. 6, sender 122 receives plaintext message 130 including plaintext data and error detection bits (600). The values of the error detection bits are based on the plaintext data such that errors can be detected in plaintext message 130 based on the plaintext data. For example, the error detection bits can be based on a polynomial function (e.g., a CRC function) applied to the plaintext data.

In the example of FIG. 6, sender 122 encrypts plaintext message 130 based on a feedback algorithm to generate an encrypted message including a set of encrypted bits for error detection, cryptographic integrity, and cryptographic authentication (602). By using a feedback algorithm, sender 122 may be able to preserve the length of plaintext message 130 during the encryption process. For example, if the protocol used by encryption combiner 126 uses the same number or fewer bits for cryptographic authenticity and integrity as for error detection bits, sender 122 can generate ciphertext 136 without adding bits. However, there may be examples where the protocol uses more bits for cryptographic authenticity and integrity, as compared to the number of error detection bits. Sender 122 can preserve the length of plaintext message 130 by using a feedback algorithm such as an autokey algorithm where encryption of a bit is based on previous encrypted or unencrypted bits.

Figure 7:
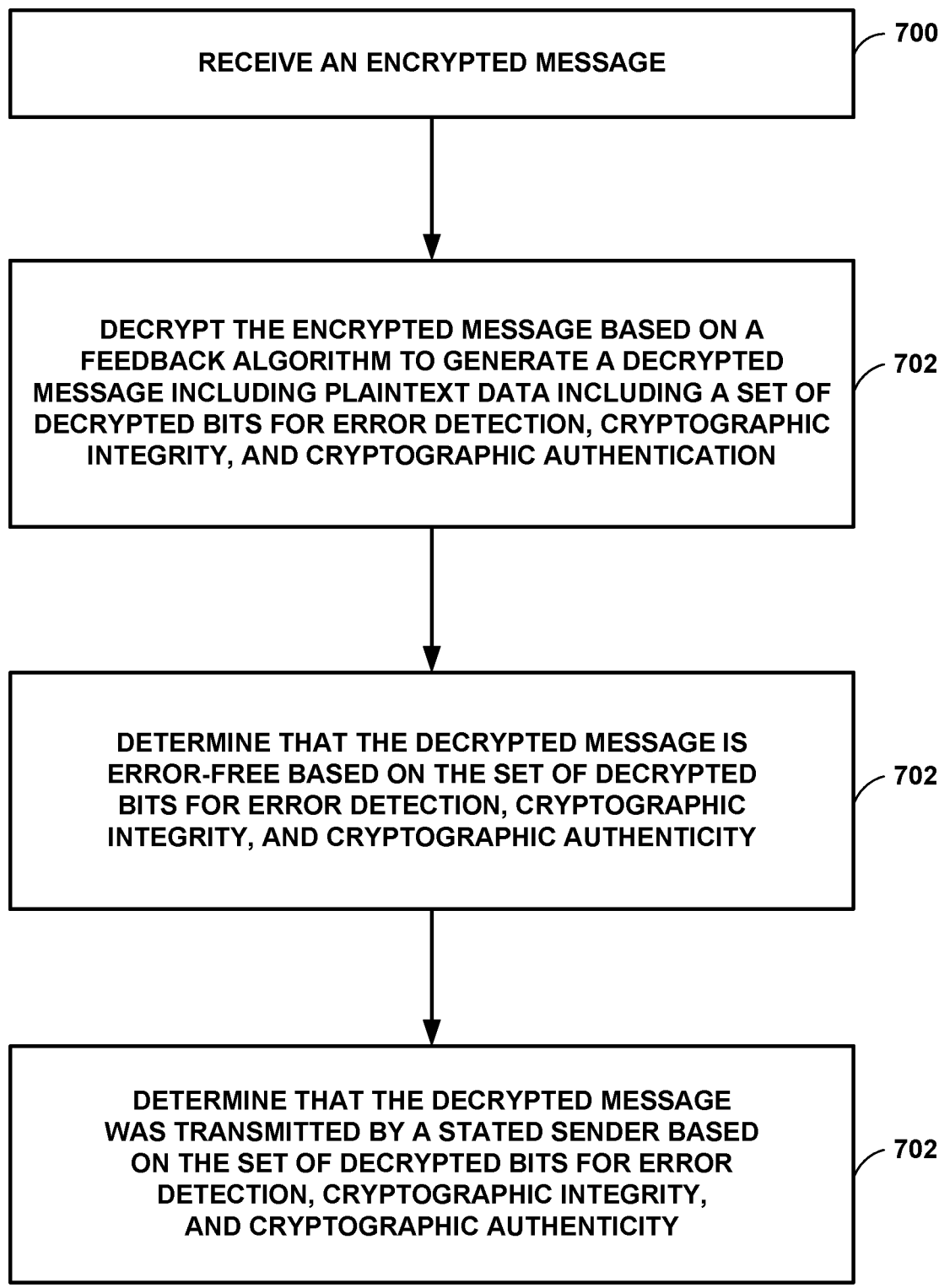
FIG. 7 is a flowchart illustrating an example process for decrypting a message and confirm cryptographic authenticity and integrity, in accordance with some examples of this disclosure.

FIG. 7 is a flowchart illustrating an example process for decrypting a message and confirm cryptographic authenticity and integrity, in accordance with some examples of this disclosure. The example process of FIG. 7 is described with reference to receiver 172 shown in FIG. 1, although other components may exemplify similar techniques.

In the example of FIG. 7, receiver 122 receives ciphertext 136 (700). Receiver 122 also decrypts ciphertext 136 based on a feedback algorithm to generate plaintext 160, which includes plaintext data and a set of decrypted bits for error detection, cryptographic integrity, and cryptographic authenticity (702). Receiver 172 can use initial symmetric key 162 to decrypt one or more bits of ciphertext 136. Receiver 172 may then use an autokey to decrypt subsequent bits of ciphertext 136. Receiver 172 can generate the autokey based on previous (encrypted or decrypted) bits of ciphertext 136.

In the example of FIG. 7, receiver 122 determines that the decrypted message is error-free based on the set of decrypted bits for error detection, cryptographic integrity, and cryptographic authentication (704). Receiver 122 also determines that the decrypted message was transmitted by a stated sender based on the set of decrypted bits for error detection, cryptographic integrity, and cryptographic authentication (706). To confirm the cryptographic integrity and authenticity of ciphertext 136, receiver 172 can calculate the expected error detection bits based on plaintext data. Receiver 122 can then compare the expected error detection bits and the actual error detection bits and determine the cryptographic integrity and authenticity of ciphertext 136 in examples in which the expected error detection bits match the actual error detection bits.

The following numbered examples demonstrate one or more aspects of the disclosure.

Example 1. A method includes receiving a plaintext message including plaintext data and error detection bits. The method also includes encrypting the plaintext message based on a feedback algorithm to generate an encrypted message including a set of encrypted bits for error detection, cryptographic integrity, and cryptographic authentication.

Example 2. The method of example 1, further including applying a hash function to the encrypted message to generate extra bits.

Example 3. The method of examples 1-2 or any combination thereof, further including applying a hash function to the plaintext message to generate extra bits Example 4. The method of examples 1-3 or any combination thereof, further including appending the extra bits to the encrypted message.

Example 5. The method of examples 1-4 or any combination thereof, where the set of encrypted bits for error detection, cryptographic integrity, and cryptographic authentication includes the extra bits.

Example 6. The method of examples 1-5 or any combination thereof, where the set of encrypted bits for error detection, cryptographic integrity, and cryptographic authentication includes the extra bits.

Example 7. The method of examples 1-6 or any combination thereof, where encrypting the plaintext message includes encrypting the plaintext message and the extra bits based on the feedback algorithm to generate the encrypted message.

Example 8. The method of examples 1-7 or any combination thereof, where encrypting the plaintext message includes encrypting the plaintext message based on a ciphertext feedback algorithm.

Example 9. The method of examples 1-8 or any combination thereof, where encrypting the plaintext message includes encrypting the plaintext message based on a plaintext feedforward algorithm.

Example 10. The method of examples 1-9 or any combination thereof, where encrypting the plaintext message includes encrypting the plaintext message based on a hybrid plaintext feedforward/ciphertext feedback algorithm.

Example 11. The method of examples 1-10 or any combination thereof, where the error detection bits include cyclic redundancy check bits.

Example 12. The method of examples 1-11 or any combination thereof, where the set of encrypted bits for error detection, cryptographic integrity, and cryptographic authentication includes a message authentication code.

Example 13. The method of examples 1-12 or any combination thereof, where encrypting the plaintext message based on the feedback algorithm includes encrypting the plaintext data based on a key.

Example 14. The method of examples 1-13 or any combination thereof, where encrypting the plaintext message based on the feedback algorithm includes encrypting the error detection bits based on the plaintext data.

Example 15. The method of examples 1-14 or any combination thereof, where the error detection bits include N bits, N is an integer, and the set of encrypted bits for error detection, cryptographic integrity, and cryptographic authentication includes N bits.

Example 16. The method of examples 1-15 or any combination thereof, where the plaintext message includes a packet-based message.

Example 17. A method includes receiving an encrypted message and decrypting the encrypted message based on a feedback algorithm to generate a decrypted message including plaintext data and a set of decrypted bits for error detection, cryptographic integrity, and cryptographic authentication. The method also includes determining that the decrypted message is error-free based on the set of decrypted bits for error detection, cryptographic integrity, and cryptographic authentication. The method further includes determining that the decrypted message was transmitted by a stated sender based on the set of decrypted bits for error detection, cryptographic integrity, and cryptographic authentication.

Example 18. The method of example 17, further including applying a hash function to a first portion of the encrypted message to generate an expected set of extra bits and determining that the expected set of extra bits matches a second portion of the encrypted message, wherein the second portion is different than the first portion.

Example 19. The method of examples 17-18 or any combination thereof, further including applying a hash function to the plaintext data (e.g., the decrypted message) and the set of decrypted bits for error detection, cryptographic integrity, and cryptographic authentication, or to the plaintext data and a portion of the set of decrypted bits for error detection, cryptographic integrity, and cryptographic authentication, to generate an expected set of extra bits.

Example 20. The method of examples 17-19 or any combination thereof, further including determining that the expected set of extra bits matches an actual set of extra bits in the encrypted message.

Example 21. The method of examples 17-20 or any combination thereof, where determining that the decrypted message is error-free is based on determining that the expected set of extra bits matches the second portion or determining that the expected set of extra bits matches the actual set of extra bits.

Example 22. The method of examples 17-21 or any combination thereof, where determining that the decrypted message was transmitted by a stated sender is based on determining that the expected set of extra bits matches the second portion or determining that the expected set of extra bits matches the actual set of extra bits.

Example 23. The method of examples 17-22 or any combination thereof, further including applying a hash function to the plaintext data and a first portion of set of decrypted bits for error detection, cryptographic integrity, and cryptographic authentication to generate an expected set of extra bits and determining that the expected set of extra bits matches a second portion of the set of decrypted bits for error detection, cryptographic integrity, and cryptographic authentication, where the second portion is different than the first portion.

Example 24. The method of examples 17-23 or any combination thereof, where determining that the decrypted message is error-free is based on determining that the expected set of extra bits matches the second portion.

Example 25. The method of examples 17-24 or any combination thereof, where determining that the decrypted message was transmitted by a stated sender is based on determining that the expected set of extra bits matches the second portion.

Example 26. The method of examples 17-25 or any combination thereof, where the set of decrypted bits for error detection, cryptographic integrity, and cryptographic authentication includes cyclic redundancy check bits.

Example 27. The method of examples 17-26 or any combination thereof, where the encrypted message includes a message authentication code.

Example 28. The method of examples 17-27 or any combination thereof, where decrypting the encrypted message includes decrypting the encrypted message based on a ciphertext feedforward algorithm.

Example 29. The method of examples 17-28 or any combination thereof, where decrypting the encrypted message includes decrypting the encrypted message based on a plaintext feedback algorithm.

Example 30. The method of examples 17-29 or any combination thereof, where decrypting the encrypted message includes decrypting the encrypted message based on a hybrid plaintext feedback/ciphertext feedforward algorithm.

Example 31. An encryption device includes processing circuitry configured to receive a plaintext message including plaintext data and error detection bits. The processing circuitry is also configured to encrypt the plaintext message based on a feedback algorithm to generate an encrypted message including a set of encrypted bits for error detection, cryptographic integrity, and cryptographic authentication. The encryption device also includes a transmitter configured to transmit the encrypted message to a receiver.

Example 32. The encryption device of example 31, where the processing circuitry is configured to perform the method of examples 1-16,35, and 36 or any combination thereof.

Example 33. A decryption device includes a receiver configured to receive an encrypted message. The decryption device also includes processing circuitry configured to decrypt the encrypted message based on a feedback algorithm to generate a decrypted message including plaintext data and a set of decrypted bits for error detection, cryptographic integrity, and cryptographic authentication. The processing circuitry is also configured to determining that the decrypted message is error-free based on the set of decrypted bits for error detection, cryptographic integrity, and cryptographic authentication. The processing circuitry is further configured to determining that the decrypted message was transmitted by a stated sender based on the set of decrypted bits for error detection, cryptographic integrity, and cryptographic authentication.

Example 34. The decryption device of example 33, where the processing circuitry is configured to perform the method of examples 17-29 or any combination thereof.

Example 35. The method of examples 1-16 or any combination thereof, wherein the error detection bits comprise plaintext error detection bits. The method further includes replacing the plaintext error detection bits with the set of encrypted bits for error detection, cryptographic integrity, and cryptographic authentication such that a length of the plaintext message remains constant after replacing the plaintext error detection bits with the set of encrypted bits; or a length of the plaintext message after replacing the plaintext error detection bits with the set of encrypted bits increases by a difference between a length of the set of encrypted bits and a length of the error detection bits.

Example 36. The method of examples 1-16 and 35 or any combination thereof, where the error detection bits are interspersed throughout the plaintext message, and encrypting the plaintext message includes encrypting the plaintext message using a single autokey encryption pass over the plaintext message.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile RAM (NVRAM), electrically erasable programmable ROM (EEPROM), or flash memory. The computer-readable storage media may be referred to as non-transitory. A computing device may also contain a more portable removable memory type to enable easy data transfer or offline data analysis.

The techniques described in this disclosure, including those attributed to sender 122, receiver 172, encryption combiners 126 and 176, protected keystream generator 124 and 174, encryption blocks 250 and 450A-450C, and decryption block 350, and various constituent components, may be implemented, at least in part, in hardware, software, firmware or any combination thereof. Such hardware, software, and/or firmware may support simultaneous or non-simultaneous bi-directional messaging and may act as an encrypter in one direction and a decrypter in the other direction. For example, various aspects of the techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between sender 122, receiver 172, encryption combiners 126 and 176, protected keystream generator 124 and 174, encryption blocks 250 and 450A-450C, and decryption block 350. Such hardware may support simultaneous or non-simultaneous bi-directional messaging and may act as an encrypter in one direction and a decrypter in the other direction. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, sender 122, receiver 172, encryption combiners 126 and 176, protected keystream generator 124 and 174, encryption blocks 250 and 450A-450C, and decryption block 350, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A method comprising:
receiving a plaintext message including plaintext data and error detection bits; and
encrypting, using an encryption key, the plaintext message based on a feedback algorithm to generate an encrypted message including ciphertext and a set of encrypted bits for error detection, cryptographic integrity, and cryptographic authentication, including encrypting the error detection bits using the encryption key and based on the feedback algorithm to generate the set of encrypted bits for error detection, cryptographic integrity, and cryptographic authentication,
wherein the set of encrypted bits for error detection, cryptographic integrity, and cryptographic authentication are at an end portion of the encrypted message and encompass less than all of the encrypted message, and
wherein the set of encrypted bits for error detection, cryptographic integrity, and cryptographic authentication are able to be decrypted using the encryption key and based on the feedback algorithm into decrypted error detection bits used to determine errors, cryptographic integrity, and cryptographic authentication of a decrypted plaintext data decrypted from the encrypted message.

2. The method of claim 1, further comprising:
applying a hash function to the encrypted message to generate extra bits; and
appending the extra bits to the encrypted message,
wherein the set of encrypted bits for error detection, cryptographic integrity, and cryptographic authentication includes the extra bits.

3. The method of claim 1, further comprising:
applying a hash function to the plaintext message to generate extra bits; and
appending the extra bits to the encrypted message;
wherein the set of encrypted bits for error detection, cryptographic integrity, and cryptographic authentication includes the extra bits.

4. The method of claim 1, further comprising applying a hash function to the plaintext message to generate extra bits,
wherein encrypting the plaintext message comprises encrypting the plaintext message and the extra bits based on the feedback algorithm to generate the encrypted message.

5. The method of claim 1, wherein encrypting the plaintext message comprises encrypting the plaintext message based on a ciphertext feedback algorithm.

6. The method of claim 1, wherein encrypting the plaintext message comprises encrypting the plaintext message based on a plaintext feedforward algorithm.

7. The method of claim 1,
wherein the error detection bits are interspersed throughout the plaintext message, and
wherein encrypting the plaintext message comprises encrypting the plaintext message using a single autokey encryption pass over the plaintext message.

8. The method of claim 1, wherein encrypting the plaintext message based on the feedback algorithm comprises:
encrypting the plaintext data based on a key; and
encrypting the error detection bits based on the plaintext data.

9. The method of claim 1,
wherein the error detection bits comprise N bits, where N is an integer, and
wherein the set of encrypted bits for error detection, cryptographic integrity, and cryptographic authentication comprises N bits.

10. A method comprising:
receiving an encrypted message including ciphertext and a set of encrypted bits for error detection, cryptographic integrity, and cryptographic authentication;
decrypting, using an encryption key, the encrypted message based on a feedback algorithm to generate a decrypted message including plaintext data and a set of decrypted bits for error detection, cryptographic integrity, and cryptographic authentication;
applying a hashing function to the plaintext data and at least a first portion of the set of decrypted bits for error detection, cryptographic integrity, and cryptographic authentication using a secret key to generate an expected set of extra bits;
determining that the decrypted message is error-free based on comparing the expected set of extra bits to at least one of: an actual set of extra bits in the encrypted message or a second portion of the set of decrypted bits for error detection, cryptographic integrity, and cryptographic authentication that is different from the first portion of the set of decrypted bits for error detection, cryptographic integrity, and cryptographic authentication; and
determining that the decrypted message was transmitted by a stated sender based on the expected set of extra bits.

11. The method of claim 10, wherein applying the hashing function to the plaintext data and at least the first portion of the set of decrypted bits for error detection, cryptographic integrity, and cryptographic authentication further comprises:
applying the hash function to the plaintext data and the set of decrypted bits for error detection, cryptographic integrity, and cryptographic authentication to generate the expected set of extra bits; and
determining that the expected set of extra bits matches the actual set of extra bits in the encrypted message,
wherein determining that the decrypted message is error-free is based on determining that the expected set of extra bits matches the actual set of extra bits, and
wherein determining that the decrypted message was transmitted by a stated sender is based on determining that the expected set of extra bits matches the actual set of extra bits.

12. The method of claim 11, wherein decrypting the encrypted message comprises decrypting the encrypted message based on a plaintext feedback algorithm.

13. The method of claim 10, wherein applying the hashing function to the plaintext data and at least the first portion of the set of decrypted bits for error detection, cryptographic integrity, and cryptographic authentication further comprises:
applying the hash function to the plaintext data and the first portion of the set of decrypted bits for error detection, cryptographic integrity, and cryptographic authentication to generate the expected set of extra bits; and
determining that the expected set of extra bits matches the second portion of the set of decrypted bits for error detection, cryptographic integrity, and cryptographic authentication,
wherein determining that the decrypted message is error-free is based on determining that the expected set of extra bits matches the second portion, and
wherein determining that the decrypted message was transmitted by a stated sender is based on determining that the expected set of extra bits matches the second portion.

14. The method of claim 10, wherein the set of decrypted bits for error detection, cryptographic integrity, and cryptographic authentication comprises cyclic redundancy check bits.

15. The method of claim 10, wherein decrypting the encrypted message comprises decrypting the encrypted message based on a ciphertext feedforward algorithm.

16. An encryption device comprising:
memory; and
processing circuitry configured to:
receive a plaintext message including plaintext data and error detection bits; and
encrypt the plaintext message using an encryption key and based on a feedback algorithm to generate an encrypted message including a set of encrypted bits for error detection, cryptographic integrity, and cryptographic authentication, including encrypting the error detection bits using the encryption key and based on the feedback algorithm to generate the set of encrypted bits for error detection, cryptographic integrity, and cryptographic authentication,
wherein the set of encrypted bits for error detection, cryptographic integrity, and cryptographic authentication are at an end portion of the encrypted message and encompass less than all of the encrypted message, and
wherein the set of encrypted bits for error detection, cryptographic integrity, and cryptographic authentication are able to be decrypted using the encryption key and based on the feedback algorithm into decrypted error detection bits used to determine errors, cryptographic integrity, and cryptographic authentication of a decrypted plaintext data decrypted from the encrypted message; and
a transmitter configured to transmit the encrypted message to a receiver.

17. The encryption device of claim 16, wherein the processing circuitry is further configured to:
apply a hash function to the plaintext message to generate extra bits; and
append the extra bits to the encrypted message,
wherein the set of encrypted bits for error detection, cryptographic integrity, and cryptographic authentication includes the extra bits.

18. The encryption device of claim 16,
wherein the error detection bits are interspersed throughout the plaintext message, and
wherein the processing circuitry is configured to encrypt the plaintext message by encrypting the plaintext message using a single autokey encryption pass over the plaintext message.

19. The encryption device of claim 16,
wherein the error detection bits comprise plaintext error detection bits, and
wherein the processing circuitry is further configured to replace the plaintext error detection bits with the set of encrypted bits for error detection, cryptographic integrity, and cryptographic authentication such that:
a length of the plaintext message remains constant after replacing the plaintext error detection bits with the set of encrypted bits; or
a length of the plaintext message after replacing the plaintext error detection bits with the set of encrypted bits increases by a difference between a length of the set of encrypted bits and a length of the error detection bits.

20. The encryption device of claim 16, wherein the processing circuitry is further configured to:
apply a hash function to the encrypted message to generate extra bits; and
append the extra bits to the encrypted message,
wherein the set of encrypted bits for error detection, cryptographic integrity, and cryptographic authentication includes the extra bits.

* * * * *